(12) United States Patent
Snell et al.

(10) Patent No.: US 7,591,193 B2
(45) Date of Patent: Sep. 22, 2009

(54) HOT-WIRE NANO-ANEMOMETER

(75) Inventors: Douglas C Snell, Albany, OR (US); Theodore I. Kamins, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/546,598

(22) Filed: Oct. 11, 2006

(65) Prior Publication Data

US 2008/0087102 A1 Apr. 17, 2008

(51) Int. Cl.
*G01P 5/06* (2006.01)
(52) U.S. Cl. .................................. 73/861.85
(58) Field of Classification Search .............. 73/861.85; 257/784, 536, 537, 213; 438/618; 324/664
See application file for complete search history.

(56) References Cited

U.S. PATENT DOCUMENTS

| | | | |
|---|---|---|---|
| 6,923,054 B2 | 8/2005 | Liu et al. | |
| 7,087,920 B1 | 8/2006 | Kamins | |
| 7,235,475 B2* | 6/2007 | Kamins | 438/618 |
| 7,307,271 B2* | 12/2007 | Islam et al. | 257/14 |
| 2005/0133476 A1 | 6/2005 | Islam et al. | |
| 2005/0212531 A1* | 9/2005 | Wei | 324/664 |
| 2006/0076644 A1* | 4/2006 | Meyer et al. | 257/536 |
| 2006/0097389 A1 | 5/2006 | Islam et al. | |
| 2007/0228421 A1* | 10/2007 | Shioya et al. | 257/213 |
| 2007/0290370 A1* | 12/2007 | Sharma et al. | 257/784 |

OTHER PUBLICATIONS

Antony Vydrin, Creating a Hot-Wire Anemometer with Nickel Nanowires, abstracts, Penn State University.
SiC-Based Miniature High-Temperature Cantilever Anemometer, NASA Tech Briefs, pp. 1-6.
Ming, et al., A Novel Micromachined Thermal Anemometer Based on Laterally Polysilicon Diode Flow Sensor, Microelectronics Center, Southeast University, China.

* cited by examiner

*Primary Examiner*—Jewel Thompson

(57) ABSTRACT

A nano-anemometer is formed by growing a nanowire to span an open area between a pair of electrodes. The nanowire is coupled to a sensing apparatus to form a hot-wire nano-anemometer.

13 Claims, 3 Drawing Sheets

HOT-WIRE NANO-ANEMOMETER

BACKGROUND

Measuring flow velocity of fluids is helpful in a variety of application, including for example research, metering, monitoring, and similar applications. One approach for monitoring flow is a so-called hot-wire anemometer. A hot-wire anemometer uses a heated wire positioned within the flow of media, such as gas, liquid, particle-laden liquid, or the like. As the media flows past the hot wire, heat is transferred from the hot wire to the media, cooling the hot wire. Flow can be determined from the temperature variation effects on the hot wire.

Hot-wire anemometers have proven useful for macroscale measurements. For example, hot-wire anemometers are used to monitor air flow within automobile engines, ventilation and heating ducts, and the like.

Less success has been achieved in using hot-wire anemometers in a microscale environment, such as microfluidics. Conventional macroscale hot-wire anemometers cannot easily be scaled into microscale dimensions. For example, as the scale of components is reduced, the components can become fragile and be easily damaged during the fabrication process. While micromachining techniques can be used to form small-scale structures, micromachining techniques are typically complex and time consuming.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

DETAILED DESCRIPTION OF EXAMPLE EMBODIMENTS

Figure 1:
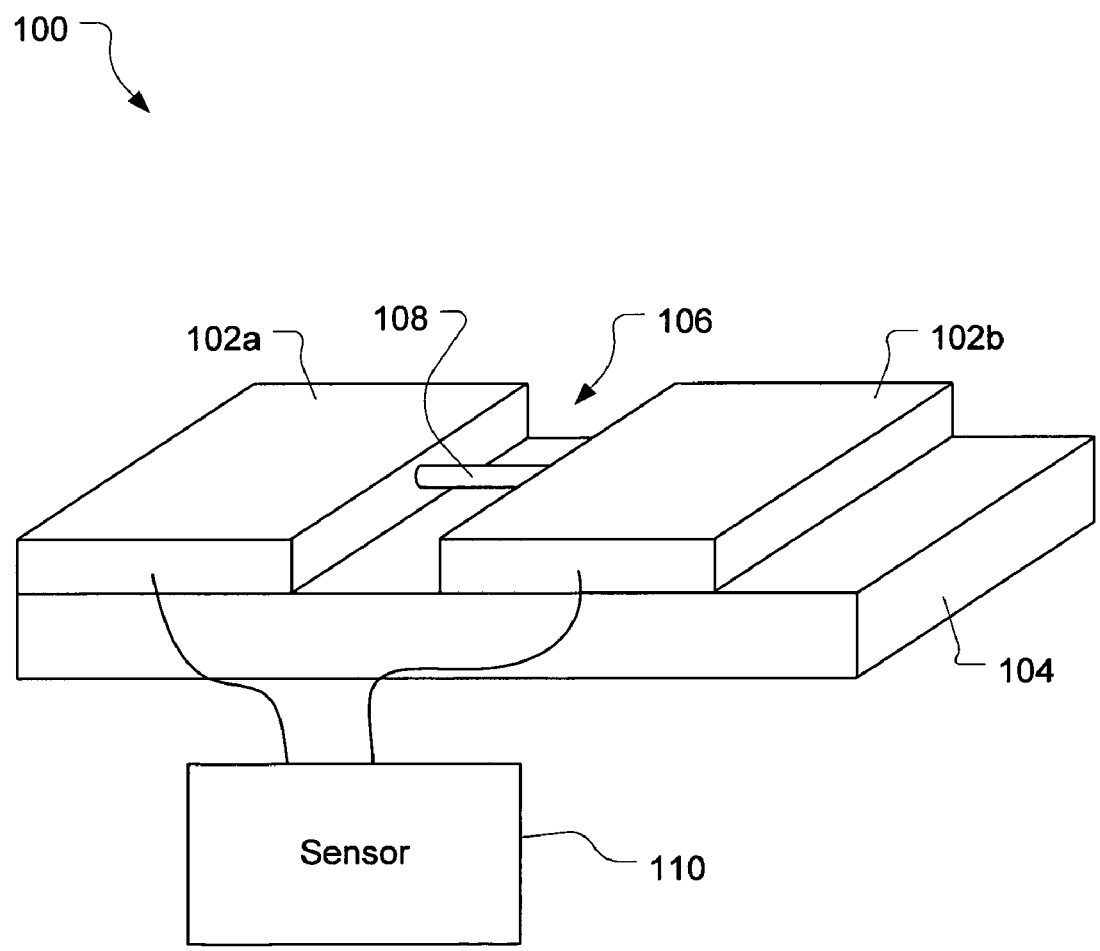
FIG. 1 is a schematic diagram of a hot-wire nano-anemometer in accordance with an embodiment of the present invention.

In describing embodiments of the present invention, the following terminology will be used.

The singular forms "a," "an," and "the" include plural referents unless the context clearly dictates otherwise. Thus, for example, reference to "a nanowire" includes reference to one or more of such nanowires.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to 100" should be interpreted to include not only the explicitly recited values of about 1 to 100, but also include individual values and sub-ranges within the indicated range. Thus, included in this numerical range are individual values such as 2, 10, and 504 and sub-ranges such as 1-50, 20-50, and 50-95, etc.

As used herein, the term "nanowire" refers to a wire having a cross sectional dimension of about 1 nanometer to 500 nanometers.

As used herein, the term "nanoparticle" refers to a particle having at least one dimension less than about 500 nanometers.

Miller indices are used herein to refer to planes, directions, and families of equivalent planes and directions as conventionally used in crystallographic nomenclature. Accordingly, a [ ] notation identifies a specific direction, e.g. [111], while a < > notation identifies a family of equivalent directions, e.g. <110> includes [110], [011], [101], [$\bar{1}\bar{1}$0], [0$\bar{1}\bar{1}$], [$\bar{1}$0$\bar{1}$], [$\bar{1}$10], [0$\bar{1}$1], [$\bar{1}$01], [1$\bar{1}$0], [01$\bar{1}$], and [10$\bar{1}$]. A ( ) notation identifies a specific plane, e.g., [100] and a { } notation identifies a family of equivalent planes.

Reference will now be made to the exemplary embodiments illustrated, and specific language will be used herein to describe the same. It will nevertheless be understood that no limitation of the scope of the invention is thereby intended.

Figure 2:
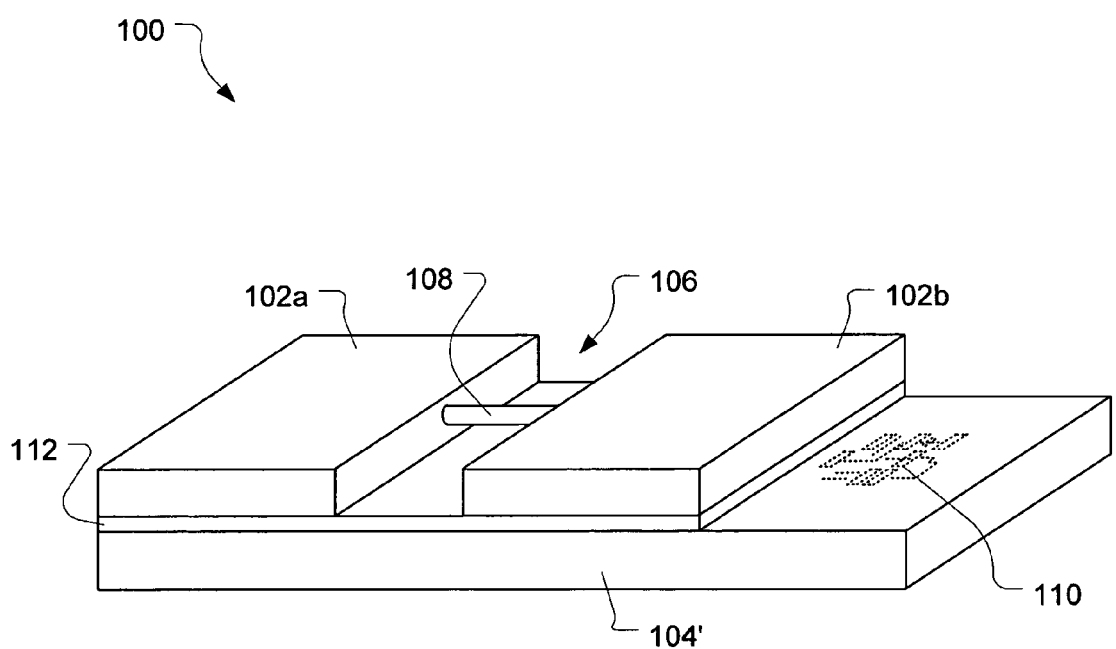
FIG. 2 is a schematic diagram of a hot-wire nano-anemometer in accordance with another embodiment of the present invention.

FIG. 1 illustrates a schematic view of a nano-anemometer in accordance with an exemplary embodiment of the present invention. The nano-anemometer, shown generally at 100, includes a pair of electrodes 102a, 102b supported by a substrate 104 and separated by an open area 106. For example, the electrodes can be conductive metal pads or doped semiconductor formed on an insulating substrate using lithographic techniques as described further below. The electrodes may be fabricated on a conductive substrate and electrically isolated from the substrate by insulating layers, or other techniques. For example, FIG. 2 illustrates a nano-anemometer fabricated on a semiconductor substrate 104' having an isolation layer 112 in accordance with another embodiment of the present invention.

A nanowire 108 is formed in situ in the open area 106, and is electrically and mechanically coupled to the pair of electrodes. For example, the nanowire can be grown from the side of the electrode as described further below.

Sensing apparatus 110 is coupled to the nanowire 108 to measure a temperature dependent property of the nanowire. The sensing apparatus may contain electrical circuitry. For example, the sensing apparatus can include a current source to provide a constant current flow through the nanowire and a temperature sensor to measure temperature of the nanowire. The sensing apparatus can include a means for measuring resistance of the nanowire. For example, one means for measuring resistance of the nanowire can be a constant current source and voltage measuring device, from which the resistance can be determined using ohms law. As another example, a means for measuring resistance can be a voltage source and a current measuring device, from which the resistance is determined using ohms law. As yet another example, a means for measuring resistance can include a Wheatstone bridge circuit. The sensing apparatus can be connected to the electrodes by way of wires or other conductive materials. As another example, the sensing apparatus may contain optical elements, for example, to optically sense the temperature of the nanowire. The sensing apparatus may be fabricated separately from the electrodes 102 and nanowire (as illustrated in FIG. 1) or the sensing apparatus may be fabricated on the substrate (as illustrated in FIG. 2 and discussed further below).

Operation of the hot wire nano-anemometer 100 is as follows. Media is introduced into the open space 106 between the electrodes so it flows past and envelops the nanowire 108. The nanowire may be heated, for example, by passing an electrical current through the nanowire. As the media flows past the nanowire, it will remove heat from the nanowire. Flow rate of the media can be inferred by measuring the effects of this heat loss.

One technique is to measure a temperature decrease of the nanowire resulting from the media flow using the sensing apparatus 110. For higher flow rates, greater temperature decreases will occur.

Alternately, the nanowire can be held at a constant voltage or current by the sensing apparatus, and resistance changes due to temperature changes determined from which the flow rate can be inferred.

As yet another example, the nanowire may be held at an approximately constant temperature by varying current (or voltage), and the changes in current (or voltage), and the flow rate inferred from the variations in current (or voltage).

Various units of measure for flow rate can be used. For example, flow rate may be expressed as a velocity (e.g. distance/time), mass times velocity, mass per unit time, volume per unit time, etc. For example, from a flow velocity measurement, flow volume rate can be calculated by taking into account the dimensions of the open area through which the media is flowing. Various other measures, such as total flow over a given time interval, can also be obtained, as will be appreciated. While high resolution measurements of flow rate or flow volume can be performed, coarse measurements can also be performed. For example, the nano-anemometer can be used to determine presence or absence of a flow through the open area.

The nanowire 108 can be a material for which the temperature of the nanowire affects an electrical property of the nanowire. For example, the nanowire can be formed from conductive material, semiconductor material, or doped semiconductor material. Various semiconductors can be used, including for example silicon, germanium, indium phosphide, other III-V compounds, II-VI compounds, etc. As a particular example, the resistance of silicon and silicon compounds can be strongly dependent upon temperature. Hence, the resistance of a silicon-containing nanowire can be measured to obtain information about the temperature of the nanowire. The nanowire can be heated by applying a current flow through the nanowire. Cooling of the nanowire by the flowing media past the nanowire will cause a change in the resistance of the nanowire.

In an embodiment, the nanowire may contain segments with different conductivity types or different materials so that junctions (e.g., p-n junctions or heterojunctions) are formed where the different segments join. These structures can advantageously increase the sensitivity of the structure to small changes in temperature caused by the flowing media.

For example, the current through a p-n junction depends sensitively on temperature, varying for a high-quality junction approximately as $\exp(-E_g/kT)$, where $E_g$ is the energy band gap of the nanowire material, k is Boltzmann's constant, and T is the absolute temperature. The rapid variation with temperature increases the sensitivity of the structure to small changes in fluid flow.

The p-n junction may be either forward biased or reverse biased. Two or more junctions may be in series for convenience of fabrication; in this case, at least one of the junctions may be reverse biased. Each electrode may be of the same conductivity type as the adjacent nanowire segment.

In general, cooling of the nanowire is a function of the type of media flowing past the nanowire and its specific heat capacity, rate of media flow, dimensions of the nanowire, and nanowire composition. Hence, the nano-anemometer may be used to determine media type, for example if flow rate is known.

The media may be, for example, a gas, a liquid, a liquid having particles suspended therein, or a combination thereof. It will be appreciated that, depending on the mass and flow rate expected for the media, different mechanical forces may be applied to the nanowire by the flowing media. Hence, the size of the nanowire may be selected to provide a desired structural strength for the nanowire. One benefit of the present invention is that the nanowire can be molecularly bonded to the sides of the electrodes to help provide structural integrity to the nano-anemometer. Techniques for growing the nanowire are discussed further below.

Several additional advantages of the nano-anemometer 100 should now be appreciated. Because of the very small scale of the nanowire 108, a small current can be used to heat the nanowire. Depending on the diameter of the nanowire and doping, current through the nanowire may be between about a few nanoamperes to about a few hundred microamperes. Accordingly, power consumption of the nano-anemometer can be quite small. Multiple nano-anemometers may be integrated into a system to provide for fine-grained measurements of flow rate at a number of points within the system. For example, multiple nano-anemometers may be fabricated on a single substrate to allow for measurement in multiple flow channels or for determination of direction of flow, or the like.

Use of a nanowire 108 as the hot wire element of the nano-anemometer 100 enables improvements in sensitivity and responsiveness (e.g., measurement time or bandwidth). The nanowire can be very small, which produces a high surface to volume ratio. For example, for a circular cylindrical nanowire, the surface area is given by $S=2\times\pi\times R\times L$, where R is the radius of the nanowire and L is the length of the nanowire. Thermal coupling between the nanowire and a media around the nanowire is proportional to the surface area. The volume is given by $V=\pi\times R^2\times L$. The thermal mass is proportional to the volume. Hence, as the radius of the nanowire is made smaller, the ratio of thermal mass (volume) to thermal coupling (surface area) drops proportionally to the radius. Accordingly, a nano-anemometer can be more responsive and sensitive than a macroscale anemometer that typically uses a wire element having a diameter of about 10 micrometers or greater.

Another benefit of the nano-anemometer 100 is that a very small overall system size can be achieved by fabricating the sensing apparatus 110 on the same substrate as the nano-anemometer. For example, the sensing apparatus can include electrical circuitry formed using photolithographic techniques, and can include transistors, resistors, capacitors, and the like. Photolithographic techniques used for fabricating integrated circuits can also be applied to fabricating the nano-anemometer.

Figure 3:
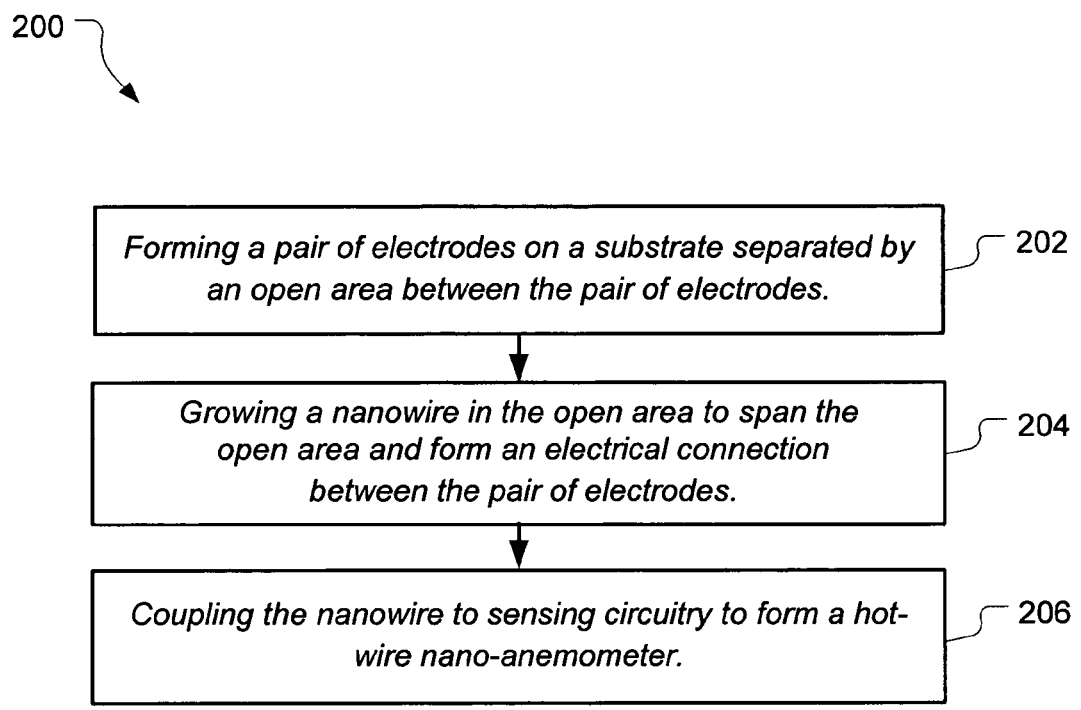
FIG. 3 is a flow chart of a method of fabricating a hot-wire nano-anemometer in accordance with an embodiment of the present invention.

One exemplary method of fabricating a hot-wire nano-anemometer will now be described. The method is shown generally at 200 in FIG. 3. One step of the method can include forming 202 a pair of electrodes on a substrate separated by an open area between the pair of electrodes. For example, a silicon substrate or a silicon-on-insulator substrate can be used. Electrodes may have a thickness between about 1 micrometer and about 50 micrometers, or more specifically between about 5 micrometers and 20 micrometers.

Electrodes can be formed using various techniques. For example, electrodes can be defined using photolithographic techniques and silicon surrounding the electrode etched using an anisotropic etchant, such as KOH. For example, when using KOH, {111} surface planes are attacked at a rate much lower than the rate for other planes, thus an electrode can be formed having a vertical surface bounded by a {111} plane after etching. Etching can include forming a channel between the electrodes to guide the flow of media.

The method 200 can also include the step of growing 204 a nanowire in the open area to span the open area and form an electrical connection between the pair of electrodes. The nanowire can be grown from the side of one electrode or from the sides of both electrodes. For example, the nanowire can be grown from a {111} plane of one electrode toward the other electrode in a <111> direction. When the nanowire reaches the second electrode, it joins to it forming a mechanical and electrical connection. It will be appreciated that the mechanical connection can be relatively strong, in that the strength of the connection can be comparable to the strength of the nanowire itself. For example, the nanowire can be essentially an extension of the crystal lattice of the electrode structure.

Growing the nanowire can be performed by various techniques. For example, the nanowire can be grown by metal-catalyzed, chemical vapor deposition. In metal-catalyzed, chemical vapor deposition, a nanoparticle of a catalytically active material (such as Au or Ti) is placed on a surface of the electrode. A gaseous precursor or precursors containing materials for forming the nanowire can then be introduced. The deposition conditions can be chosen such that the gaseous precursors do not decompose to form a solid deposit on the electrode generally but decompose near the catalytically active nanoparticle.

For example, a silicon nanowire may be grown on a silicon electrode. When growing the silicon nanowire, silicon atoms are formed on the surface of the catalyst nanoparticle. As silicon atoms diffuse through or around the catalyst nanoparticle and precipitate at the interface between the silicon and the catalyst nanoparticle, the silicon atoms push the nanoparticle away from the surface and form a column of silicon having a diameter comparable to the diameter of the catalyst nanoparticle. Gases, such as HCl, can be added to moderate the reaction and control the properties of the nanowire.

A silicon nanowire can be doped, for example, by including a dopant source, such as diborane ($B_2H_6$) or phosphine ($PH_3$) to provide acceptor or donor atoms, respectively, during the growth process of silicon nanowires. Other appropriate dopant species can be used for a nanowire composed of other materials.

Growth conditions, such as precursor formulations, dopant sources, etc. can be varied as the nanowire is grown so that the nanowire has a non-uniform composition along its length. For example, doping can be varied during growth to form p-n junctions, primary gaseous precursors can be varied during growth to form heterojunctions, or other growth conditions can also be varied to cause the nanowire properties to vary over the length of the nanowire.

The nanowire can also be coated with a coating material. The coating material may be deposited on the nanowire after it is grown, for example, using chemical vapor deposition, self assembly from a liquid solution, sputtering, or similar techniques. The coating can help to protect the nanowire, for example, by providing a chemically protective (e.g., chemically inert) surface relative to the media which will flow past the nanowire or an electrically insulating material. Various coating materials may be used, including, for example, metals (e.g., zinc, aluminum, nickel), oxide layers (e.g., silicon dioxide, silicon carbide), polymers (e.g., polytetrafluoroethylene or polyvinyl chloride), etc.

It will be appreciated that an electrically insulating material can be helpful if the media is electrically conductive.

More than one nanowire can be grown simultaneously. Hence, the method can include growing a plurality of nanowires in the open area. Multiple nanowires can be used to increase the sensitivity of the nano-anemometer or to provide for multiple points of measurement.

The method 200 can also include the step of coupling 206 the nanowire to a sensing apparatus to form a hot-wire nano-anemometer. Coupling may be provided by wires, for example, if the sensing apparatus is separate from the substrate. Alternately, the sensing apparatus may be formed on the substrate, using electrical components formed using lithographic and other semiconductor processing techniques. By integrating the sensing apparatus onto the substrate, a very compact, integrated nano-anemometer can be fabricated.

Several additional advantages provided by growing the nanowire in situ should now be appreciated. By growing the nanowire from the wall of the electrode, high mechanical integrity can be obtained. This is because the nanowire is molecularly bonded to the wall of the electrode. Because the nanowire may be formed from the same material as the wall of the electrode, crystal lattice stresses can be reduced. Because the nanowire may be formed from the same material as the substrate, the occurrence of differential thermal coefficients may also be minimized. If the nanowire is formed from a material with a different lattice constant and thermal coefficient of expansion than the electrodes, the small contact area (essentially the cross section of the nanowire) allows expansion to relax the strain, again improving the connection and the quality of the grown nanowire.

Another advantage of growing the nanowire in situ is that the risk of damage to the nanowire is reduced, since it need not be manipulated to put it into proper position. In addition, the nanowire can be formed within a channel between the electrodes, helping to protect the nanowire during handling or subsequent fabrication steps.

Summarizing and reiterating to some extent, a technique for the fabrication of nano-anemometers has been illustrated. The use of a nanowire for the hot-wire sensing element may provide for improved resolution and responsiveness. Growing the nanowire in situ allows for fine control of the nanowire properties and reduced potential for damage to the nanowire. Overall, the fabrication process is simplified relative to micromechanical machining, providing the potential for low cost.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A hot wire nano-anemometer comprising:
a pair of electrodes supported by a substrate and separated by an open area;
a nanowire formed in situ in the open area, electrically and mechanically coupled to the pair of electrodes; and
a sensing apparatus coupled to the nanowire to measure a temperature dependent property of the nanowire.

2. The hot wire nano-anemometer of claim 1, wherein the nanowire is silicon.

3. The hot wire nano-anemometer of claim 1, wherein the nanowire is a doped semiconductor.

4. The hot wire nano-anemometer of claim 1, wherein the nanowire comprises a p-n junction.

5. The hot wire nano-anemometer of claim 1, wherein the nanowire has a non-uniform composition along the length of the nanowire.

6. The hot wire nano-anemometer of claim 1, further comprising an electrically insulating coating on an exterior surface of the nanowire.

7. The hot wire nano-anemometer of claim 1, further comprising a chemically protective coating on an exterior surface of the nanowire.

8. The hot wire nano-anemometer of claim 1, wherein the pair of electrodes comprise opposing sidewalls positioned to form a channel.

9. The hot wire nano-anemometer of claim 1, wherein the nanowire extends substantially perpendicularly to the opposing sidewalls of the electrodes.

10. The hot wire nano-anemometer of claim 1, wherein the sensing apparatus is integral with the substrate.

11. A method of using a hot wire nano-anemometer
providing a hot wire nano-anemometer having a nanowire grown in situ between a pair of electrodes to span an open area between the pair of electrodes;
flowing a media through the open area to encompass the nanowire; and
measuring a characteristic of the nanowire affected by flowing of the media to obtain information related to the flow of media through the open area.

12. The method of claim 11, wherein the characteristic of the nanowire is electrical resistance.

13. The method of claim 11, wherein the information is flow velocity.

* * * * *